US012724637B2

(12) United States Patent
Ezrielev et al.

(10) Patent No.: US 12,724,637 B2
(45) Date of Patent: Sep. 1, 2026

(54) PRIORITIZING CURATION TARGETS FOR DATA CURATION BASED ON DOWNSTREAM IMPACT

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 603 days.

(21) Appl. No.: 18/343,941

(22) Filed: Jun. 29, 2023

(65) Prior Publication Data

US 2025/0004855 A1 Jan. 2, 2025

(51) Int. Cl.

| | |
|---|---|
| ***G06F 9/50*** | (2006.01) |
| ***G06F 16/215*** | (2019.01) |
| ***G06F 18/10*** | (2023.01) |

(52) U.S. Cl.

CPC .......... *G06F 9/5005* (2013.01); *G06F 9/5038* (2013.01); *G06F 16/215* (2019.01); *G06F 18/10* (2023.01)

(58) Field of Classification Search

None

See application file for complete search history.

(56) References Cited

U.S. PATENT DOCUMENTS

| | | | |
|---|---|---|---|
| 7,315,805 | B2 | 1/2008 | Slater |
| 9,990,383 | B2 | 6/2018 | Brinnand |
| 10,168,691 | B2 | 1/2019 | Zornio et al. |
| 10,339,470 | B1 | 7/2019 | Dutta |
| 10,936,479 | B2 | 3/2021 | Maag et al. |
| 11,101,037 | B2 | 8/2021 | Allen |

(Continued)

OTHER PUBLICATIONS

Bosch et al., "Towards Automated Detection of Data Pipeline Faults", 2020 27th Asia-Pacific Software Engineering Conference (APSEC). IEEE, pp. 346-355 (Year: 2020).

(Continued)

*Primary Examiner* — Qing Yuan Wu

(74) *Attorney, Agent, or Firm* — WOMBLE BOND DICKINSON (US) LLP

(57) ABSTRACT

Methods and systems for curating data by a data manager are disclosed. Data may be curated from various data sources before being provided to downstream consumers that may rely on the trustworthiness of the curated data in order to provide desired computer-implemented services. During the data curation process, data curation resources are used to improve the trustworthiness and/or value of the collected data. However, data curation resources (e.g., data curators, computing resources) may be limited and/or insufficient to perform the data curation process as desired, which may result in unusable and/or uncurated (e.g., untrustworthy) data. Thus, portions of the data (e.g., curation targets) may be prioritized (e.g., relative to other curation targets). The curation targets may be curated with the available data curation resources based on their relative priority in order to reduce the likelihood of providing untrustworthy data to entities (e.g., downstream consumers) that facilitate the computer-implemented services.

20 Claims, 5 Drawing Sheets

(56) References Cited

U.S. PATENT DOCUMENTS

| | | | |
|---|---|---|---|
| 11,221,270 | B2 | 1/2022 | Evans |
| 11,341,605 | B1 | 5/2022 | Singh |
| 11,853,853 | B1 | 12/2023 | Beauchesne et al. |
| 12,008,046 | B1 | 6/2024 | Curtis et al. |
| 12,216,651 | B2 | 2/2025 | Krishnan |
| 12,242,892 | B1 | 3/2025 | Burnett |
| 2004/0064750 | A1 | 4/2004 | Conway |
| 2006/0009881 | A1 | 1/2006 | Ferber et al. |
| 2013/0205285 | A1 | 8/2013 | Pizlo |
| 2013/0226838 | A1 | 8/2013 | Chu |
| 2013/0227573 | A1 | 8/2013 | Morsi |
| 2014/0037161 | A1 | 2/2014 | Rucker |
| 2014/0136184 | A1 | 5/2014 | Hatsek |
| 2016/0098037 | A1 | 4/2016 | Zornio |
| 2018/0046926 | A1 | 2/2018 | Achin |
| 2018/0081871 | A1 | 3/2018 | Williams |
| 2018/0137431 | A1 | 5/2018 | Goldfarb |
| 2019/0034430 | A1 | 1/2019 | Das |
| 2019/0236204 | A1 | 8/2019 | Canim |
| 2019/0251479 | A1 | 8/2019 | Anderson et al. |
| 2019/0370263 | A1 | 12/2019 | Nucci |
| 2020/0166558 | A1 | 5/2020 | Weis |
| 2020/0167224 | A1 | 5/2020 | Abali |
| 2020/0202478 | A1 | 6/2020 | Thumpudi et al. |
| 2020/0293684 | A1 | 9/2020 | Harris |
| 2020/0344325 | A1 | 10/2020 | Sarisky |
| 2020/0387836 | A1 | 12/2020 | Nasr-Azadani |
| 2021/0027771 | A1 | 1/2021 | Hall |
| 2021/0098133 | A1 | 4/2021 | Chowdhry |
| 2021/0116505 | A1 | 4/2021 | Shu |
| 2021/0117548 | A1 | 4/2021 | Gokhman |
| 2021/0374143 | A1 | 12/2021 | Neill |
| 2021/0377286 | A1 | 12/2021 | Shukla et al. |
| 2021/0406110 | A1 | 12/2021 | Vaid et al. |
| 2022/0092234 | A1 | 3/2022 | Karri |
| 2022/0215142 | A1 | 7/2022 | Gutierrez |
| 2022/0215243 | A1 | 7/2022 | Narayanaswami |
| 2022/0301027 | A1 | 9/2022 | Basta |
| 2022/0309411 | A1* | 9/2022 | Ramaswamy ....... G06Q 10/067 |
| 2022/0310276 | A1 | 9/2022 | Wilkinson |
| 2022/0374399 | A1 | 11/2022 | Kementsietsidis |
| 2023/0014438 | A1 | 1/2023 | Jones |
| 2023/0040284 | A1 | 2/2023 | Ali-Tolppa |
| 2023/0040834 | A1 | 2/2023 | Haile |
| 2023/0126260 | A1 | 4/2023 | Elsakhawy et al. |
| 2023/0153095 | A1 | 5/2023 | Rahill-Marier |
| 2023/0161596 | A1 | 5/2023 | Vadapandeshwara |
| 2023/0196096 | A1 | 6/2023 | Milne |
| 2023/0213930 | A1 | 7/2023 | Rakshit |
| 2023/0293907 | A1 | 9/2023 | Shade |
| 2023/0315078 | A1 | 10/2023 | Sepulveda et al. |
| 2023/0342281 | A1 | 10/2023 | Haile |
| 2023/0418280 | A1 | 12/2023 | Emery |
| 2024/0095576 | A1 | 3/2024 | Pinho |
| 2024/0119364 | A1 | 4/2024 | Jain |
| 2024/0126888 | A1 | 4/2024 | Kalou et al. |
| 2024/0235952 | A9 | 7/2024 | Hicks |
| 2024/0281419 | A1 | 8/2024 | Alfaras |
| 2024/0281522 | A1 | 8/2024 | Kuo |
| 2024/0320252 | A1 | 9/2024 | U |
| 2024/0330136 | A1 | 10/2024 | Furlong |
| 2024/0370749 | A1 | 11/2024 | Binkley |
| 2024/0412104 | A1 | 12/2024 | Zhang |

OTHER PUBLICATIONS

Grafberger et al., Towards Interactively Improving ML Data Preparation Code via "Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

Chowdhury et al., "An Approach for Data Pipeline with Distributed Query Engine for Industrial Applications", published in 2020 25th IEEE International Conference on Emerging Technologies and Factory Automation (ETFA), retrieved from <https://ieeexplore.ieee.org/stamp/stamp.jsp?tp=&arnumber=9212050> on Sep. 9, 2025 (4 pages).

Wang, Haozhe, et al., "A graph neural network-based digital twin for network slicing management," IEEE Transactions on Industrial Informatics 18.2 (2020): 1367-1376 (11 Pages).

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

Stonebraker et al., "Data Curation at Scale: The Data Tamer System", 6th Biennial Conference on Innovative Data Systems Research (CIDR '13), Jan. 6-9, 2013, 10 pps. (Year: 2013).

T. Leemann et al., "I Prefer not to say: Protecting User Consent in Models with Optional Personal Data", retrieved from <https://arxiv.org/abs/2210.13954v4> Version 4, Jun. 6, 2023, pp. 1-32 (32 pages).

* cited by examiner

PRIORITIZING CURATION TARGETS FOR DATA CURATION BASED ON DOWNSTREAM IMPACT

FIELD

Embodiments disclosed herein relate generally to data management. More particularly, embodiments disclosed herein relate to systems and methods to improve data curation processes.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
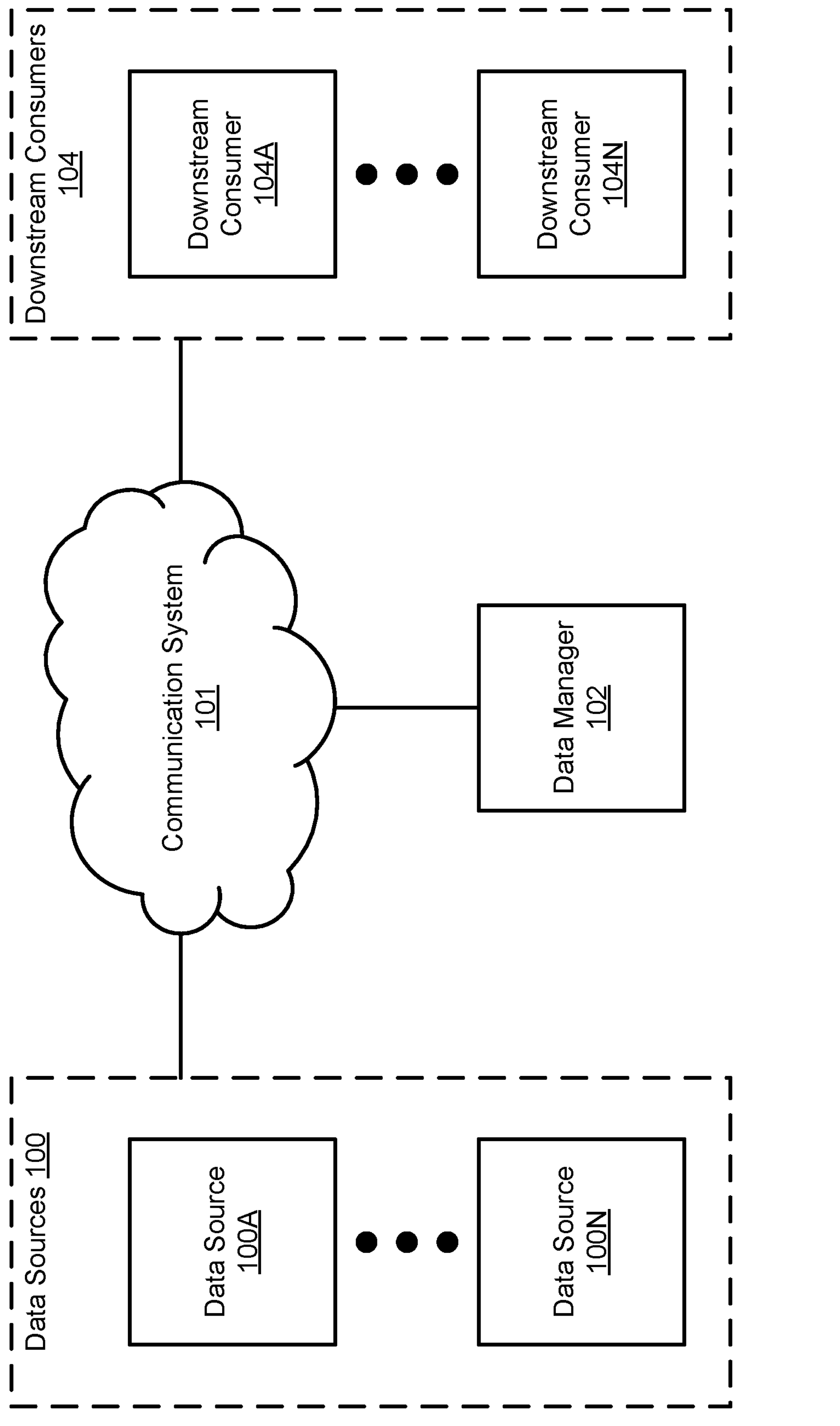
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for curating data from data sources prior to addition to (e.g., being stored in) a data repository. Data curation may include obtaining data from various data sources and/or storing the data in one or more data repositories. The data repository may be managed by a data manager that may also manage the data curation process. Data curation may include processes such as collecting, organizing (e.g., indexing, labeling, cataloging, etc.), preserving, and/or maintaining data for use by consumers. For example, downstream consumers of curated data may rely on raw and/or processed data being made accessible in order to provide computer-implemented services.

Data curation may improve the value of data collected from various data sources (e.g., that may provide inconsistent and/or disorganized datasets). For example, data curation may remediate inaccurate data (e.g., data that includes incorrect information, knowledge gaps, etc.). Inaccurate data may be untrustworthy (e.g., biased, unreliable, etc.) for use in downstream applications (e.g., downstream consumption that may facilitate computer-implemented services). Thus, the data curation process may increase the value of the collected data by improving its usability, accessibility, and/or trustworthiness.

The data curation process may utilize data curation resources (e.g., one or more data curators using one or more data processing systems) to generate curated data from data collected from various sources and/or read from various data repositories. However, if insufficient data curation resources are available to perform the data curation, then it may not be possible to curate the collected data in the desired manner (e.g., the resulting curated data complying with a schema for downstream use). This may lead to (i) an inability to provide curated data to downstream consumers (e.g., which may result in a stoppage of computer-implemented services), and/or (ii) providing untrustworthy (e.g., uncurated) data to downstream consumers.

Thus, the consumption of uncurated data (e.g., partially curated data) may pose a risk to downstream consumers (e.g., the computer-implemented services facilitated by the downstream consumers). Therefore, when data curation resources are limited and/or insufficient, the data curation process may be performed (e.g., first and/or only) on portions of the data (e.g., curation targets). To do so, curation targets may be identified and/or prioritized based on, for example, their (potential) effects on downstream consumers that consume the curated data, and/or the computer-implemented services driven by the curated data.

By doing so, embodiments disclosed herein may provide a system for prioritizing curation targets of data collected from various data sources for the purpose of data curation. The data curation process may be improved by prioritizing performing data curation for high-priority curation targets over lower-priority curation targets using the available data curation resources. The resulting curated data (e.g., partially curated data) may be more trustworthy (e.g., for downstream use) than uncurated data and/or randomly partially curated data (e.g., partially curated data that was not curated based on the prioritization of curation targets) and may therefore increase the likelihood of providing the downstream consumers with uninterrupted and/or reliable access to trustworthy data.

By doing so, an improved computing device and/or distributed system may be obtained. The improved device and/or system may be more likely to be able to provide the desired computer-implemented services.

In an embodiment, a method for curating data by a data manager is provided. The method may include making a determination regarding whether sufficient data curation resources are available to perform a data curation process for curation targets within a target period of time.

In an instance of the determination where there are insufficient data curation resources available, the method may include: identifying a data curation resource of the data curation resources that has available curation bandwidth; selecting a curation target of the curation targets for the data curation resource based on a rank ordering of the curation targets, the rank ordering being based on an impact score for each of the curation targets; and, assigning the curation target to the data curation resource in order to complete the data curation process for a portion of the curation targets within the target period of time.

The method may further include: obtaining at least a portion of the data from a data source; identifying the curation targets of the data; obtaining the impact score for at least one curation target of the curation targets based on scoring criteria; and, obtaining a rank for the at least one curation target based on the impact score, the rank being usable to order the at least one curation target.

The impact score may be based on at least one of: a frequency of use of the at least one curation target by an inference model that ingests at least a second portion of the data to generate an inference; a measure of relative contribution of the at least one curation target to the inference; a measure of confidence in the inference; and, a measure of importance of the at least one curation target or the inference to a downstream consumer.

Each impact score may be based at least in part, on a number of occurrences of the curation target in downstream use of the data.

Each impact score may be further based at least in part, on an attribution score for the curation target, the attribution score indicating a relative level of contribution to a future outcome in which the curation target is usable in the downstream use of the data.

Each impact score may be further based at least in part, on a level of confidence in predicting the future outcome through the downstream use of the data.

Each impact score may be further based at least in part, on a measure of importance of the curation target to a downstream consumer.

Each impact score may be further based at least in part, on a measure of dependence that the downstream consumer has on the predicting of the future outcome.

The portion of the curation targets may exclude at least one of the curation targets.

The method may further include curating the curation target using the data curation resource to obtain at least partially curated data, the at least partially curated data complying with a schema for downstream use of the curation target.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

The computer-implemented services may be performed, in part, by using artificial intelligence models (e.g., inference models). The inference models may, for example, be implemented with artificial neural networks, decision tress, regression analysis, and/or any other type of model usable for learning purposes. For example, data obtained from data sources 100 may be used as training data (e.g., used to train the inference models to perform the computer-implemented services), and/or as ingest data (e.g., used as input to the trained inference models in order to perform the computer-implemented services).

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services. Continuing with the above example, data manager 102 may obtain the temperature measurements from data sources 100 as part of the data pipeline. Data manager 102 may obtain the temperature measurements via a request through an API and/or via other methods.

The process of obtaining, organizing and/or integrating data collected from various data sources by data manager 102 may be referred to as data curation. Data curation may be performed by a data processing system of data manager 102 and/or a data processing system independent of data manager 102 (e.g., a third party).

Data curation may include any process that may improve the downstream usability of the collected data. For example, data curation may include processes and/or methods to remediate incomplete, irrelevant, and/or inaccurate (e.g., misrepresented) data among the collected data. The results of data curation processes (e.g., curated data) may be stored and/or provided for downstream use. For example, curated data may be provided directly to downstream consumers (e.g., for statistical analysis), and/or as input to downstream processes (e.g., as training data and/or ingest data for inference modeling).

For example, data manager 102 may curate a volume of image data by labeling each image of the volume of image data (e.g., labeling with strings of text that describe content found in each image). As part of the data curation process, data manager 102 may also identify existing errors and/or omissions of existing labels and may correct the identified labels before storing the curated image data temporarily and/or permanently in a data lake or other storage architecture. Following curating the image data, data manager 102 may provide the image data and the corresponding labels to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data via data manager 102 as input data for climate models. Specifically, downstream consumers 104 may utilize the temperature data to simulate future temperature conditions in various environments over time (e.g., to predict weather patterns, climate change, etc.).

However, the quality and/or availability of computer-implemented services may be affected, at least in part, by the quality and/or availability of curated data. For example, uncurated data may be untrustworthy (e.g., due to poor quality, missing and/or incorrect data) and may negatively affect the computer-implemented services provided to and/or by downstream consumers. To avoid potential negative effects of uncurated data on the computer-implemented services, the downstream consumers may prefer to rely on curated data; however, if adequate volumes of curated data are unavailable, the associated computer-implemented services may be slowed, and/or suspended (e.g., when data is being collected and/or curated to be used as ingest data for an inference model that provides the computer-implemented services via inference generation).

The quality and/or availability of curated data may depend on the quantity and/or availability of data curation resources. For example, the data collected from data sources 100 may include curation targets (e.g., identified based on data type, intended use of data, etc.). The curation targets may include portions of the data, such as one or more data points having one or more fields and/or one or more fields of the one or more data points. For example, a curation target may refer to a value (e.g., of a field), a data point (e.g., including multiple fields), and/or groups of data points (e.g., portions of data). The resources used for data curation (e.g., data curators, computing resources, etc.) may be limited, which may result in an inability to curate all desired curation targets of the large volumes of data collected from data sources 100 in a given period of time.

For example, a data curator may be responsible for curating portions of the large volumes of data (e.g., curation targets). The data curator may not have sufficient curation bandwidth (e.g., a number of hours of labor and/or access to a quantity of computing resources) in order to perform the data curation process in the allotted time frame, which may result in uncurated targets (e.g., untrustworthy portions of data) persisting in the data.

Continuing with the above example regarding climate models, if insufficient volumes of curated data are available (e.g., leading to biased temperature samples) and/or if uncurated data (e.g., that may include irrelevant, missing, and/or incorrect temperature data) is introduced in climate modeling, then the resulting climate models may be skewed. Further, the skewed climate models may negatively impact the simulations, which may prevent downstream consumers 104 from providing the desired computer-implemented services.

Thus, in cases where sufficient data curation resources may be unavailable to curate collected data (e.g., in a target period of time), the curation targets of the collected data may be prioritized. The curation targets may be prioritized based on an impact score. The impact score may measure an impact of curating (or not curating) each of the curation targets on the downstream use of the data. For example, higher priority curation targets may be curated with the available data curation resources before lower priority curation targets, resulting in partially curated data that may prevent and/or mitigate the potential negative effects of uncurated data on the downstream computer-implemented services.

In general, embodiments disclosed herein may provide methods, systems, and/or devices for curating data based on available data curation resources. The data curation methods may (i) determine whether sufficient data curation resources are available to perform a data curation process for curation targets of the data (e.g., within a specified period of time), and when insufficient data curation resources are available, (ii) identify and/or prioritize the curation targets (e.g., based on the potential impact of the curated targets on downstream outcomes), and/or (iii) assign the prioritized curation targets to data curation resources (e.g., to be curated in order of priority by the data curation resources) to that may perform the curation process, to obtain partially curated data.

The partially curated data (e.g., curated based on the relative priority of other curation targets) may be more trustworthy than uncurated data, and/or more trustworthy than other (randomly) partially curated data whose curation targets were randomly curated (e.g., not curated based on the relative priority of other curation targets). By doing so, the system may be more likely to be able to provide trustworthy data to downstream consumers that may facilitate performance of the desired computer-implemented services.

Figure 2:
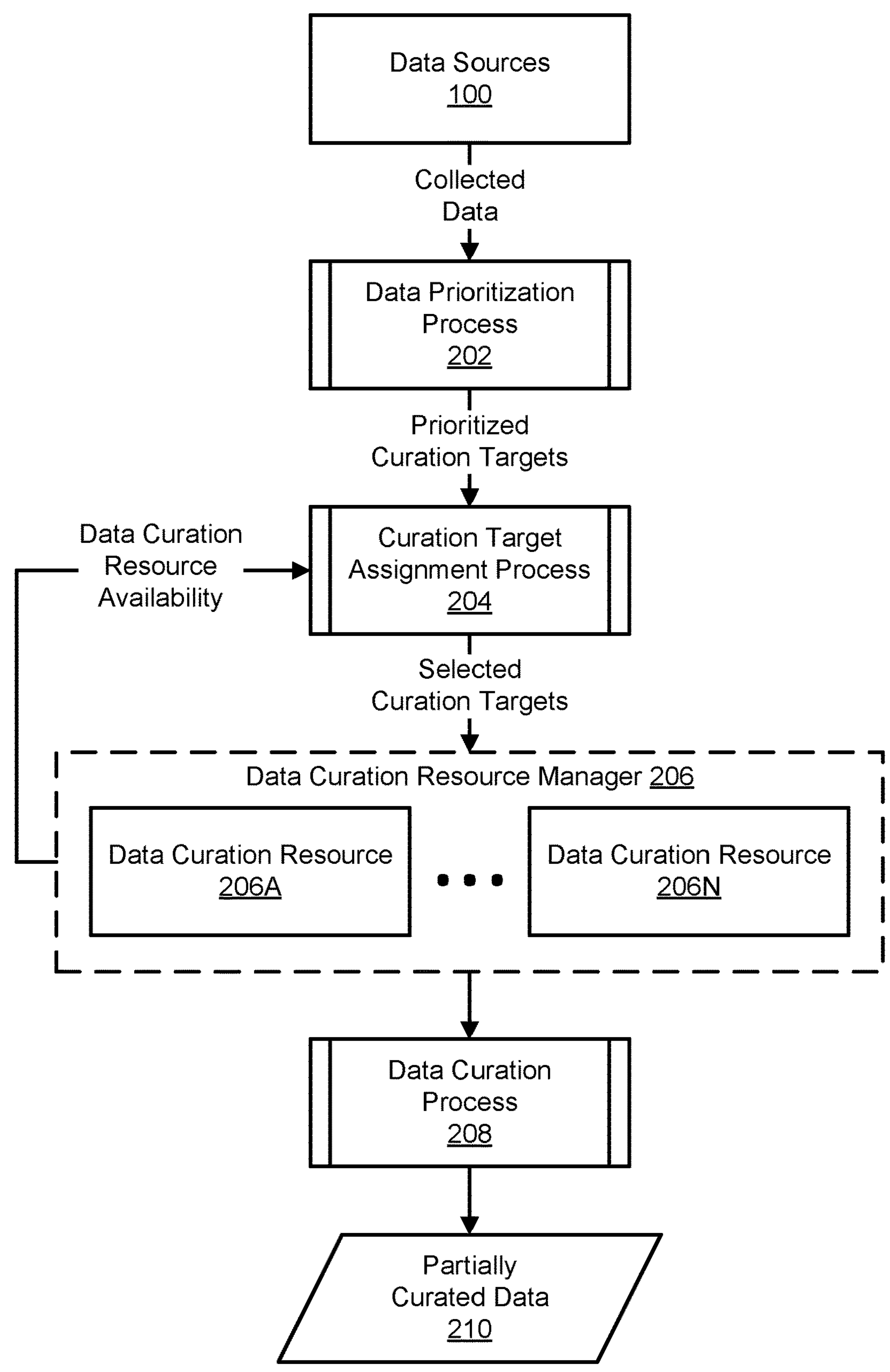
FIG. 2 shows a data flow diagram illustrating a process for prioritizing curation targets in accordance with an embodiment.
Figure 3A:
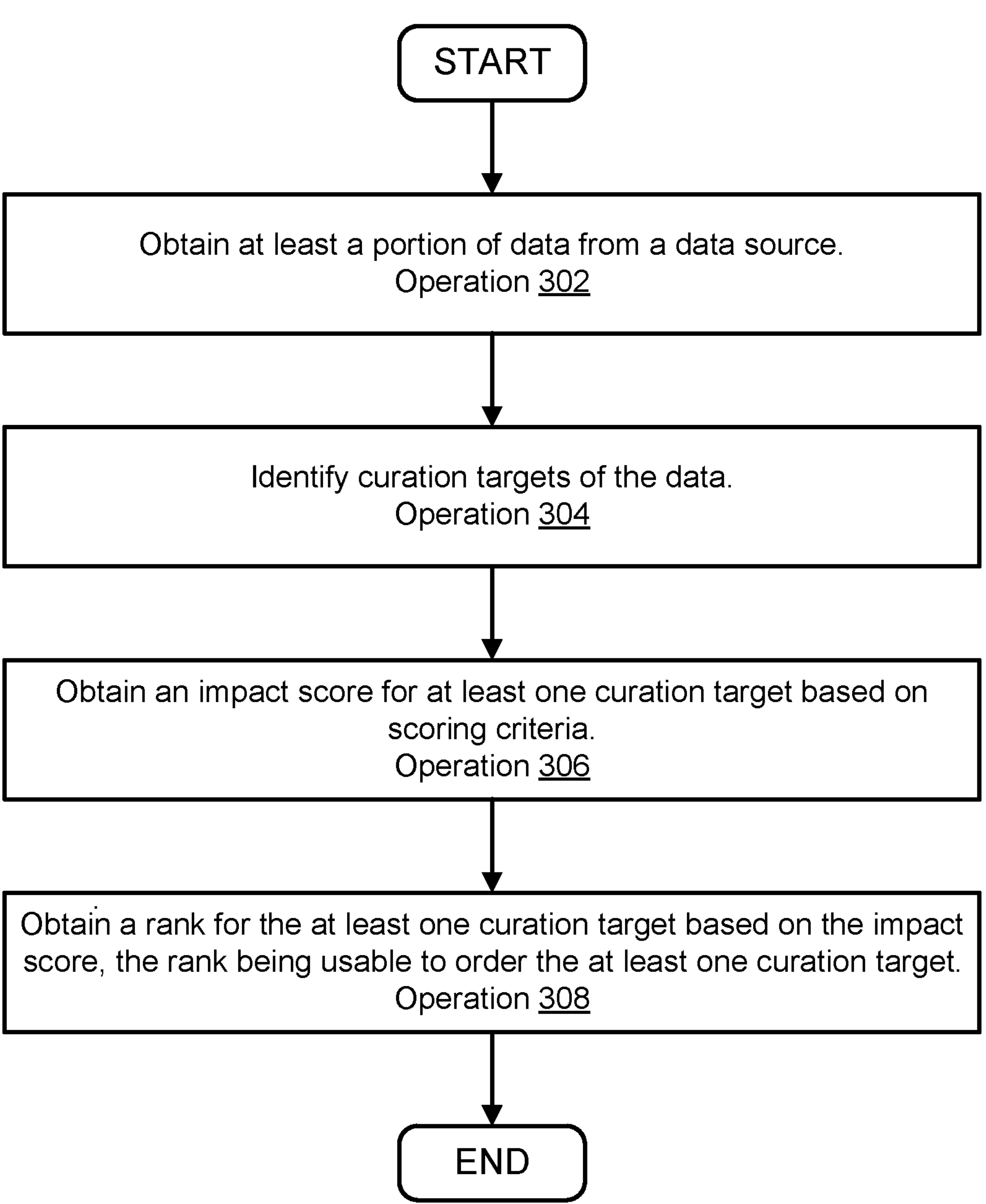
FIG. 3A shows a flow diagram illustrating a method for ranking curation targets in accordance with an embodiment.
Figure 3B:
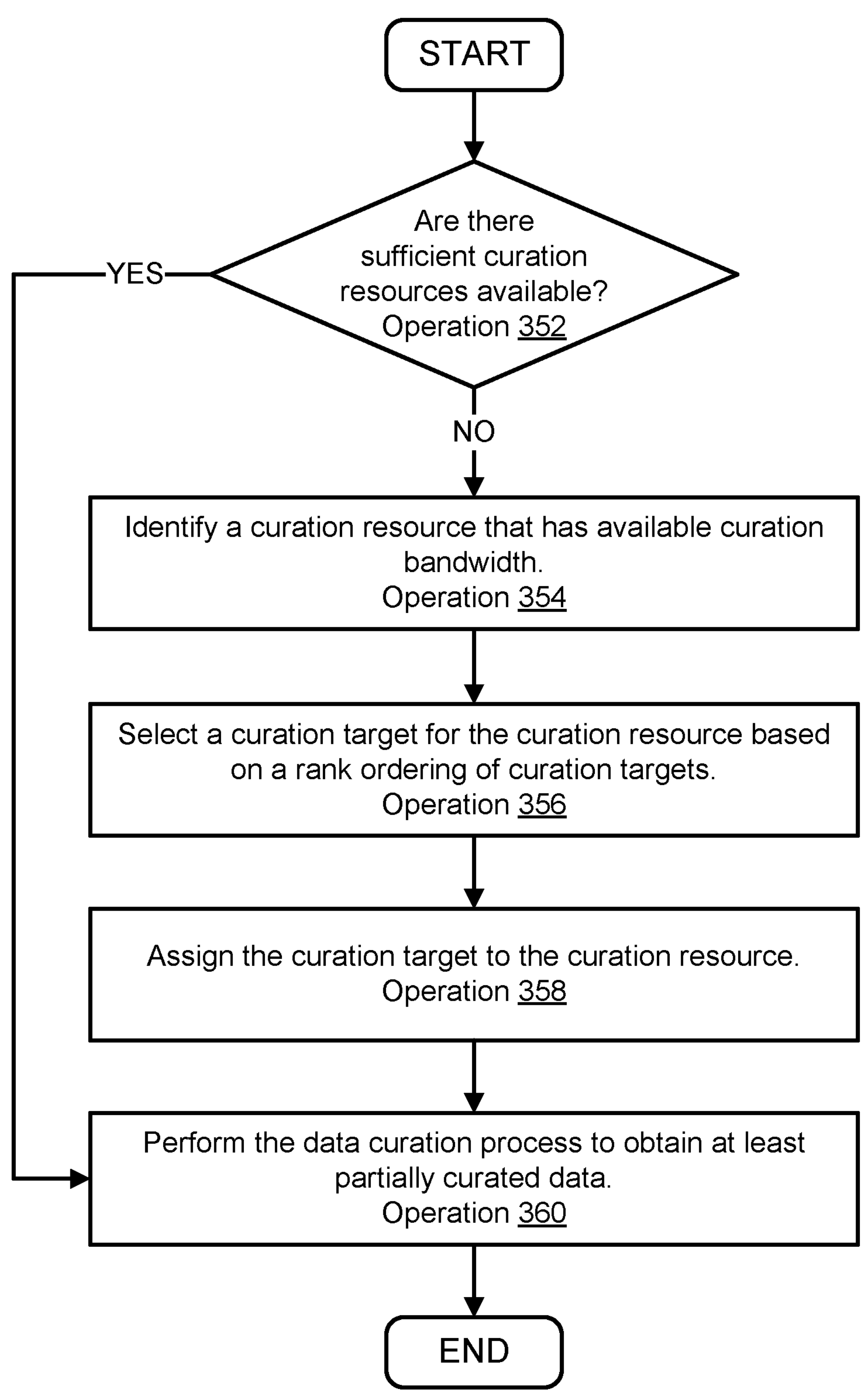
FIG. 3B shows a flow diagram illustrating a method for curating data by a data manager in accordance with an embodiment.

When performing its functionality, data sources 100, data manager 102, and/or downstream consumers 104 may perform all, or a portion, of the methods and/or actions shown in FIGS. 2-3B.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

While the above example relates to climate models, it will be appreciated that data may be collected and/or stored in data repositories in order to provide other types of computer-implemented services without departing from embodiments disclosed herein.

The system described in FIG. 1 may be used to prioritize identified curation targets during data curation. Performing data curation based on curation target prioritization may prevent and/or reduce potential negative effects of partially curated data in the downstream use of the data. The following operations described in FIG. 2 may be performed by the system in FIG. 1 when providing this functionality.

Turning to FIG. 2, a data flow diagram is shown in accordance with an embodiment. The data flow diagram may illustrate a process for prioritizing curation targets in a system similar to that of FIG. 1. The curation targets may be identified, prioritized, assigned (e.g., to a data curation resource), and/or curated in order to generate curated data (e.g., partially curated data).

As discussed with respect to FIG. 1, data sources 100 may provide data for use by downstream consumers 104 in order to facilitate the provision of computer-implemented services. Before being provided to downstream consumers 104, the data (e.g., collected data) may undergo a data curation process. The data curation process may include collecting, organizing, and/or transforming the collected data into data usable by downstream consumers 104 using data curation resources.

Collected data obtained from data sources 100 (e.g., collected data) may include any number of datasets collected from any number of data sources. The collected data may undergo data prioritization process 202. Curation targets of the collected data may be identified as part of data prioritization process 202, and/or prior to data prioritization process 202. For example, the curation targets may be identified as part of a curation target identification process (not shown) and/or by a third party.

The curation targets may indicate portions of the collected data (e.g., one or more fields of one or more data points) that may benefit from data curation (e.g., metadata extraction and/or annotation) in order to be usable in downstream applications of the data. In other words, the identified curation targets may be the portions of data that are desired to be curated.

For example, continuing with the temperature measurements example, curation targets of the temperature data may include one or more field values, such as location field values (e.g., latitude and/or longitude of the position of a temperature sensor) and/or temperature field values (e.g., the recorded temperature value for a given time). The curation target may include information regarding a field, such as field types (e.g., a text string or a numerical value), field contents (e.g., a minimum or maximum number of characters per field), field units (e.g., degrees Celsius or degrees fahrenheit), etc. The curation targets may also include a subset of data points (of all data points of the collected data). For example, the curation targets may be all data collected from temperature sensors located in a specified geographical region.

The identified curation targets may be prioritized (e.g., when sufficient data curation resources for performing the curation process on all identified curation targets are unavailable). To prioritize the identified curation targets, data prioritization process 202 may include obtaining an impact score for one or more of the identified curation targets. The impact score for a curation target of the collected data may indicate a level of impact that the curation target may have on the intended downstream use of the collected data.

For example, curated data may be used as ingest data to a trained inference model. The trained inference model may be trained (e.g., using training data) to generate an inference based on the ingested data (e.g., the collected data). The generated inference may be provided to a downstream consumer, and/or the curated data may be provided to the downstream consumer (e.g., as ingest data to an inference model managed by the downstream consumer). The downstream consumer may use the curated data and/or the generated inference in order to facilitate computer-implemented services.

The impact score may be determined based on scoring criteria. The scoring criteria for the curation target may include (i) a frequency of use of the curation target (e.g., by an inference model that ingests the curation target to obtain an inference, the curation target may be, for example, a specific data value ingested by an inference model, all data values corresponding to a feature of the inference model, etc.), (ii) a measure of relative contribution of the curation target (e.g., to the inference, similarly, the curation target may be, for example, a specific data value, all data values corresponding to the feature, etc.), (iii) a measure of confidence in the inference (e.g., by comparing an uncertainty quantification for the inference to inference for other similar curation targets based on one or more statistical metrics), (iv) a measure of importance of the curation target and/or the inference to a downstream consumer (e.g., that may consume the curation target and/or the inference), and/or (v) other measures of impact of the curation target in downstream applications.

The frequency of use of the curation target may reflect a number of occurrences of the curation target in downstream use of the data. For example, the curation target may be a portion of ingest data that may be used for analysis (e.g., a feature) by an inference model and therefore its use (e.g., by the inference model) may occur a large number of times. Thus, the impact score of the curation target may be modified (e.g., increased) to reflect that the curation target has a more significant impact on the downstream use of the data.

The measure of relative contribution of the curation target may include an attribution score (e.g., a feature importance score) for the curation target. The attribution score may indicate a relative level of contribution of the curation target (e.g., a feature) to a future outcome (e.g., an inference). The attribution score (e.g., feature importance score) may include a local attribution score and/or a global attribution score (e.g., depending on the curation target).

For example, the curation target (e.g., the portion of ingest data for an inference model) may be used by downstream consumers (e.g., an inference model managed by downstream consumers) to generate an inference. Relationships between each of the features of the ingest data (e.g., the curation target) and the generated inference(s) may be interpreted to obtain feature attribution information. The feature attribution information may indicate a relative level of contribution of the feature of the inference model (e.g., the curation target) to the inference. For example, if a curation target has a higher relative level of contribution (when compared to other curation targets of the ingest data), then the impact score of the curation target may be modified (e.g., increased) to reflect a more significant impact on the downstream use of the data.

The measure of confidence in the inference (e.g., generated by the inference model that ingests the curation target) may be based on a level of confidence in predicting the future outcome through the downstream use of the uncurated curation target (e.g., the collected data for which the curation target has not been curated). For example, the level of confidence in the inference may be indicated by the predictive uncertainty of the inference (e.g., an uncertainty quantification associated with the inference). The uncertainty quantification may be used to determine the level of confidence in the inference (e.g., generated without curation of the curation target).

The measure of confidence in the inference may include the level of confidence in the inference and/or a relative level of confidence in the inference. The relative level of confidence in the inference may include a comparison between the level of confidence in the inference and levels of confidence associated with other inferences generated by the inference model (e.g., generated using similar curation targets to the curation target).

For example, if the uncertainty quantification associated with the inference exceeds a threshold (e.g., the threshold being based on and/or reflecting the uncertainty quantifications associated with the other inferences), then the inference may be considered untrustworthy. Thus, the impact score of the curation target may be modified (e.g., increased) to reflect that the curation target may have a more significant impact on the downstream use of the data if left uncurated.

The measure of importance of the curation target and/or the inference to a downstream consumer may indicate a measure of dependence that the downstream consumer has on the curation target and/or the predicting of the future outcome (e.g., the inference). For example, if, based on historical consumption, the downstream consumer tends to consume large volumes of same and/or similar curation targets (or inferences), then the downstream consumer may depend heavily on the curation target (or inference); thus, the impact score of the curation target may be modified (e.g., increased) to reflect a more significant impact on the downstream use of the data.

Returning to the impact score, the impact score may be determined from a function (e.g., an impact score function) of one or more variables (e.g., scoring criteria). For example, the impact score function may include one or more weighted scoring criteria. The function and/or weights may be determined based on the intended downstream use of the collected data. For example, if the downstream consumer does not intend to obtain the inference generated by the inference model, then a variable representing the measure of importance of the inference to the downstream consumer may be weighted inferiorly to other variables of the impact score function or excluded from the impact score function.

Impact scores may be obtained for each identified curation target. Based in the impact score of each curation target, the curation targets may be ranked. For example, the curation targets may be ranked in descending order, with the highest-ranked impact scores being associated with the curation targets that may have the most impact on the downstream use of the data. In other words, the ranked curation targets may represent a list of prioritized curation targets of the data. Data prioritization process 202 may include providing the list of prioritized curation targets for use in curation target assignment process 204.

Curation target assignment process 204 may include obtaining data curation resource availability information (e.g., from data curation resource manager 206). The data curation resource availability information may include (i) a schedule of availability of one or more data curators (e.g., who may perform data curation), (ii) a schedule of availability of computing resources (e.g., usable for the data curation process), (iii) the available curation bandwidth of each of the scheduled data curation resources, and/or (iv) other metrics regarding data curation resources and their current and/or future availability (e.g., data curation speed, efficiency, proficiency, etc.)

Curation target assignment process 204 may also include identifying a quantity of data curation resources needed to perform the data curation process for one or more curation targets (e.g., of the prioritized curation targets) within a target period of time. For example, curation target assignment process 204 may include identifying a number of data curators and/or a number of data processing systems needed to curate each of the curation targets before a deadline.

Curation target assignment process 204 may include selecting one or more curation targets from the prioritized list of curation targets (e.g., selected in order of highest priority to lowest priority) based on the data curation resource availability information and the identified quantity of data curation resources needed to curate the curation targets (e.g., within the target period of time). The selected curation targets may exclude at least one of the ranked curation targets. The selected curation targets may be provided to data curation resource manager 206, which may delegate curation duties to one or more data curation resources (e.g., 206A-206N).

Data curation resource manager 206 may identify one or more data curation resources of the data curation resources (e.g., data curation resource 206A). The one or more identified data curation resource(s) may be a data curation resource with available curation bandwidth (e.g., to perform the data curation process on the selected curation targets). Data curation resource manager 206 may assign one or more of the selected curation targets to the one or more identified data curation resources (e.g., 206A-206N). Using the assigned data curation resources, the one or more curation targets may undergo data curation process 208.

Data curation process 208 may include performing data curation for each of the curation targets (e.g., using the assigned data curation resources). Data curation process 208 may include data cleansing, organizing (e.g., structuring, indexing, cataloging), transforming, and/or any other process or method of data curation known in the art that may render the curation targets compliant with a schema for downstream use.

Data curation process 208 may include generating at least partially curated data 210. Partially curated data 210 may include curation targets that have completed data curation process 208 (e.g., higher priority selected curation targets) and curation targets that have not completed data curation process 208 (e.g., lower priority curation targets not selected during curation target assignment process 204). Partially curated data 210 (e.g., including curated high-impact curation targets) may be more trustworthy for downstream use than other randomly partially curated data (e.g., including one or more uncurated high-impact curation targets).

Partially curated data 210 may be used by downstream consumers and/or may undergo additional curation (e.g., be updated by other partially curated and/or curated data) if and/or when additional curation bandwidth becomes available.

As discussed with respect to FIG. 1, the impact of supplying untrustworthy data to downstream consumers may adversely affect the intended computer-implemented services. Thus, as illustrated in FIG. 2, the system of FIG. 1 may identify and/or prioritize curation targets, manage data curation resources (e.g., in order to assign curation targets to available data curation resources), and/or perform data curation to generate curated data (e.g., partially curated data).

In an embodiment, the one or more entities performing the operations shown in FIG. 2 are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform methods for data curation by a data manager. The methods may include identifying curation targets and/or prioritizing (e.g., by rank of impact score) the identified curation targets when data curation resources are limited (e.g., when sufficient data curation resources are unavailable to curate all identified curation targets within a target period of time). FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method for ranking curation targets in accordance with an embodiment is shown. The method may be performed by a data processing system, and/or another device.

At operation 302, at least a portion of the data may be obtained from a data source. The at least a portion of the data (referred to hereafter as the data) may be obtained by (i) reading the data from storage (e.g., managed by the data source), and/or (ii) receiving the data from a device of the data source (e.g., a third party and/or remote device). The data may include unstructured and/or disorganized data and therefore the usability (e.g., by downstream consumers) of the data may increase after undergoing a data curation process.

At operation 304, the curation targets of the data may be identified. The curation targets may be identified by (i) receiving a list of curation targets (e.g., from storage, from a third party, etc.), and/or (ii) generating the curation targets (e.g., by analyzing the intended downstream application(s) of the data). For example, if the data is intended to be used as ingest data for an inference model, the curation targets may include features of the ingest data required by the inference model. The features may be identified by using one or more feature selection methods (e.g., supervised and/or unsupervised inference models that may generate a list of relevant features for the inference model). Any number of curation targets of the data may be identified.

At operation 306, the impact score for at least one curation target of the curation targets may be obtained based on scoring criteria. The impact score may be obtained by (i) reading the impact score from storage, (ii) receiving the impact score from another device (e.g., a third party and/or remote device), and/or (iii) generating the impact score. The impact score may be generated by evaluating an impact score function for the at least one curation target (e.g., curation targets). The impact score may be based on scoring criteria, the scoring criteria indicating different measures for estimating the impact of the curation targets on future outcomes of the use of the data.

The impact score function may include a function of one or more (weighted) variables (e.g., the scoring criteria). For example, the variables (e.g., scoring criteria) may include (i) a frequency of use of the curation targets by an inference model that ingests the data to generate an inference, (ii) a measure of relative contribution of the curation targets to the inference, (iii) a measure of confidence in the inference (e.g., an uncertainty quantification associated with the inference), (iv) a measure of importance of the curation targets (and/or the inference) to a downstream consumer, and/or (v) any other variable that may quantify the impact of the curation targets on the downstream use of the data. Refer to FIG. 2 for more details regarding the scoring criteria.

The scoring criteria may be (i) read from storage, (ii) received from another device (e.g., a third party and/or remote device), and/or (iii) generated. The frequency of use may be generated, for example, by enumerating the instances of use of the curation targets (e.g., the number of instances where the curation targets are used as features for input to an inference model).

The measure of relative contribution may be generated, for example, by obtaining attribution scores (e.g., feature importance scores) for the curation targets (e.g., features) input to an inference model. To obtain the attribution scores, the inference model may be interpreted using an interpretation framework, where relationships (e.g., defined by the architecture and parameters of inference model) between features (e.g., curation targets) and inferences (e.g., predictions) may be interpreted using various methods (e.g., Shapley additive explanations (SHAP), gradient-weighted class activation mapping (Grad-CAM), etc.). The feature attribution method may output the relevance (e.g., contribution) of each input (e.g., feature) of the inference model to a future outcome (e.g., an inference generated by the inference model).

The measure of confidence in the inference may be generated by feeding the data (e.g., prior to data curation) to an inference model (e.g., a probabilistic model) to obtain an inference as well as an associated uncertainty quantification. For example, the uncertainty quantification may be determined using methods for estimating inference model uncertainty such as Monte Carlo dropout methods, deep ensemble methods, etc. Generating the measure of confidence in the inference may include evaluating a statistical metric based on the uncertainty quantification associated with the inference and uncertainty quantifications of other inferences (e.g., generated by the model using similar curation targets to the curation target). For example, the measure of confidence in the inference may be a ratio of the uncertainty quantification of the inference and the average uncertainty quantification of the other inferences.

The measure of importance to the curation targets and/or the inference to a downstream consumer may be generated by (i) receiving information (e.g., from the downstream consumer) regarding the measure of importance, and/or (ii) analyzing information regarding the historical consumption of the curation targets and/or the inference (e.g., by downstream consumers). For example, if the historical consumption of the curation target is high (with respect to other curation targets), the measure of importance of the curation targets to the downstream consumer may be high (with respect to other curation targets). The measure of importance to the downstream consumer may indicate a measure of dependence that the downstream consumer has on the curation target and/or on the inference (e.g., the predicting of the future outcome).

As discussed above, the scoring criteria (e.g., based on a curation target) may be used to obtain the impact score (e.g., of the curation target) using an impact score function whose variables may include the scoring criteria. Impact scores may be obtained for one or more of the identified curation targets.

At operation 308, a rank for the at least one curation target (e.g., curation targets) may be obtained based on the impact score. The rank may be obtained by (i) sorting the curation targets by their impact score, and/or (ii) enumerating the sorted curation targets to assign their rank. For example, the curation target with the highest impact score may be the highest ranked curation target.

Thus, the rank may be usable to order the curation targets by impact score (e.g., highest priority for data curation). The curation targets may be prioritized when insufficient resources are available to curate all identified curation targets (discussed further with respect to FIG. 3B).

The method may end following operation 308.

Using the methods illustrated in FIG. 3A, a system in accordance with embodiments disclosed herein may be placed in condition to obtain a rank for one or more identified curation targets (e.g., based on an impact score for the one or more identified curation targets). The rank may be used to obtain a rank ordering of the curation targets, the rank ordering indicating the curation targets that may have the most potential impact on downstream use of the data. Thus, the rank ordering of the curation targets may be used to prioritize curation targets that are intended to undergo data curation.

Turning to FIG. 3B, a flow diagram illustrating a method for curating data by a data manager in accordance with an embodiment is shown. The method may be performed by a data processing system, and/or another device.

At operation 352, a determination may be made regarding whether sufficient data curation resources are available to perform a data curation process for curation targets within a target period of time. The determination may be made by (i) obtaining data curation resource availability information (e.g., from a data curation resource manager) to determine a quantity of available data curation resources for the target period of time, (ii) obtaining a quantity of data curation resources required to perform the data curation process for each of the curation targets in the target period of time, and/or (iii) comparing the quantity of available data curation resources to the quantity of required data curation resources to determine whether sufficient data curation resources are available to complete the data curation process in the target period of time.

If it is determined that there are sufficient data curation resources available (e.g., the quantity of available data curation resources exceeds the quantity of required data curation resources), then the method may proceed to operation 360 following operation 352. Otherwise, the method may proceed to operation 354 following operation 352.

At operation 354, where there are insufficient data curation resources available a data curation resource of the data curation resources that has available curation bandwidth may be identified. The data curation resource may be identified by (i) obtaining and/or analyzing data curation resource availability information, and/or (ii) receiving a notification (e.g., from a data curation resource manager) indicating that the data curation resource has been made available, the notification including the associated curation bandwidth for the data curation resource.

The data curation resource availability information may be obtained by (i) reading the data curation resource availability information from storage (e.g., managed by a data curation resource manager), (ii) receiving the data curation resource availability information from another device (e.g., a third party and/or remote device), and/or (iii) generating the data curation resource availability information.

For example, the data curation resource availability information may be generated by a user and/or a data processing system that schedules and/or monitors data curation resource use (e.g., the data curation resource manager). The data curation resource availability information may include information regarding the available bandwidth of one or more data curators and/or one or more computing resources usable to perform the data curation process.

At operation 356, a curation target of the curation targets for the data curation resource may be selected based on a rank ordering of the curation targets. The curation target may be selected by (i) ordering the curation targets by rank (e.g., the rank obtained in operation 308 of FIG. 3A) to obtain a rank ordering of curation targets, the rank ordering being based on an impact score for each of the curation targets, and/or (iii) selecting one or more highest-ranked curation targets from the rank ordering based on an interpretation of the rank ordering (e.g., the selected curation targets having higher potential impact on downstream use when compared to curation targets that are not selected). Selecting the curation target may also include obtaining the rank ordering from another entity (e.g., a third party), interpreting the obtained rank ordering, and/or selecting the curation targets based on the interpretation of the rank ordering.

For example, as discussed with respect to operation 352, each curation target may be associated with a quantity of data curation resources required to perform the data curation process (e.g., in the target period of time). Thus, the curation targets may be selected, in order (e.g., beginning with the highest ranked until the lowest ranked), until the required quantity of data curation resources exceeds the data curation bandwidth of the identified data curation resource (e.g., identified in operation 354). In other words, the curation targets may be selected (e.g., in order of curation priority) until the curation bandwidth of one or more identified data curation resources is expended. The selected curation targets may exclude at least one of the possible (e.g., identified) curation targets.

At operation 358, the curation target may be assigned to the data curation resource in order to complete the data curation process for a portion of the curation targets within the target period of time. The curation target may be assigned by providing information regarding the curation target to the identified data curation resource (e.g., data curators and/or computing resources). The curation target may also be assigned (e.g., automatically) to the identified data curation resource by another entity (e.g., by a third party), based on the information regarding the curation target.

Information regarding the curation target may include (i) a storage location(s) of the data to be curated, (ii) a curation target identifier and/or type, (iii) a target time period for completion of the data curation process, and/or (iv) other information useful for performing the curation process for the assigned curation targets.

At operation 360, where there are insufficient data curation resources available, the data curation process may be performed to obtain at least partially curated data. The data curation process may be performed by curating the selected (e.g., assigned) curation targets using the data curation resource.

Performing the data curation process may include transmitting instructions for data curation (e.g., including a list of prioritized curation targets) to another entity (e.g., a third party) who may perform the data curation process. One or more selected curation targets may be curated by one or more data curation resources. Further, the selected curation targets may be curated in a specific order, such as by rank ordering (e.g., priority) in order to complete the data curation process within the target period of time.

Performing the data curation process may include organizing, cleaning, and/or transforming the data so that the resulting partially curated data complies (e.g., the selected curation targets comply) with a schema for downstream use. The data curation process may be performed using any software, method, and/or process familiar to those in the art. Upon completion of the data curation process (e.g., when the target period of time has been reached), partially curated data may be obtained. The partially curated data may be made available for downstream use (e.g., to downstream consumers).

Note that the data curation process may continue after the target period of time has been reached (e.g., to begin data curation of lower priority curation targets not selected in operation 356) in order to obtain updated (e.g., partially, or fully) curated data. Upon completion of the continued data curation process (e.g., after at least one previously unselected curation target has been curated), the partially curated data may be replaced with the updated curated data.

The method may end following operation 360.

Returning to operation 352, the method may proceed to operation 360 following operation 352 when it is determined that there are sufficient data curation resources available.

At operation 360, where there are sufficient data curation resources available, the data curation process may be performed to obtain curated data. The data curation process may be performed by curating the curation targets (e.g., using the available data curation resources). Performing the data curation process may also include (i) transmitting a list of curation targets to entities managing the curation resources, and/or (ii) transmitting a notification that the list is available (e.g., and that the data curation resources may begin a data curation process for the list of curation targets).

Upon completion of the data curation process, curated data may be obtained. The curated data may comply (e.g., the curation targets comply) with a schema for downstream use and may therefore be made available for downstream use (e.g., to downstream consumers).

The method may end following operation 360.

Using the methods illustrated in FIGS. 3A-3B, a system in accordance with embodiments disclosed herein may be placed in condition to (i) identify curation targets of data (e.g., the intent being to perform a data curation process for the data); and, when insufficient data curation resources are available to perform the data curation process, (ii) prioritizing the curation targets based on their potential impact on downstream applications (e.g., using an impact score based on scoring criteria), (iii) selecting and/or assigning a portion of the curation targets for data curation, and/or (iv) obtaining partially curated data that is more likely to be usable and/or trusted by downstream consumers than uncurated data and/or randomly partially curated data. By providing usable and trustworthy partially curated data to downstream consumers, the computer-implemented services facilitated by the downstream consumers may be improved. For example, the partially curated data may increase the likelihood of avoiding interruptions and/or reductions in the quality of the computer-implemented services that may rely on the partially curated data.

Figure 4:
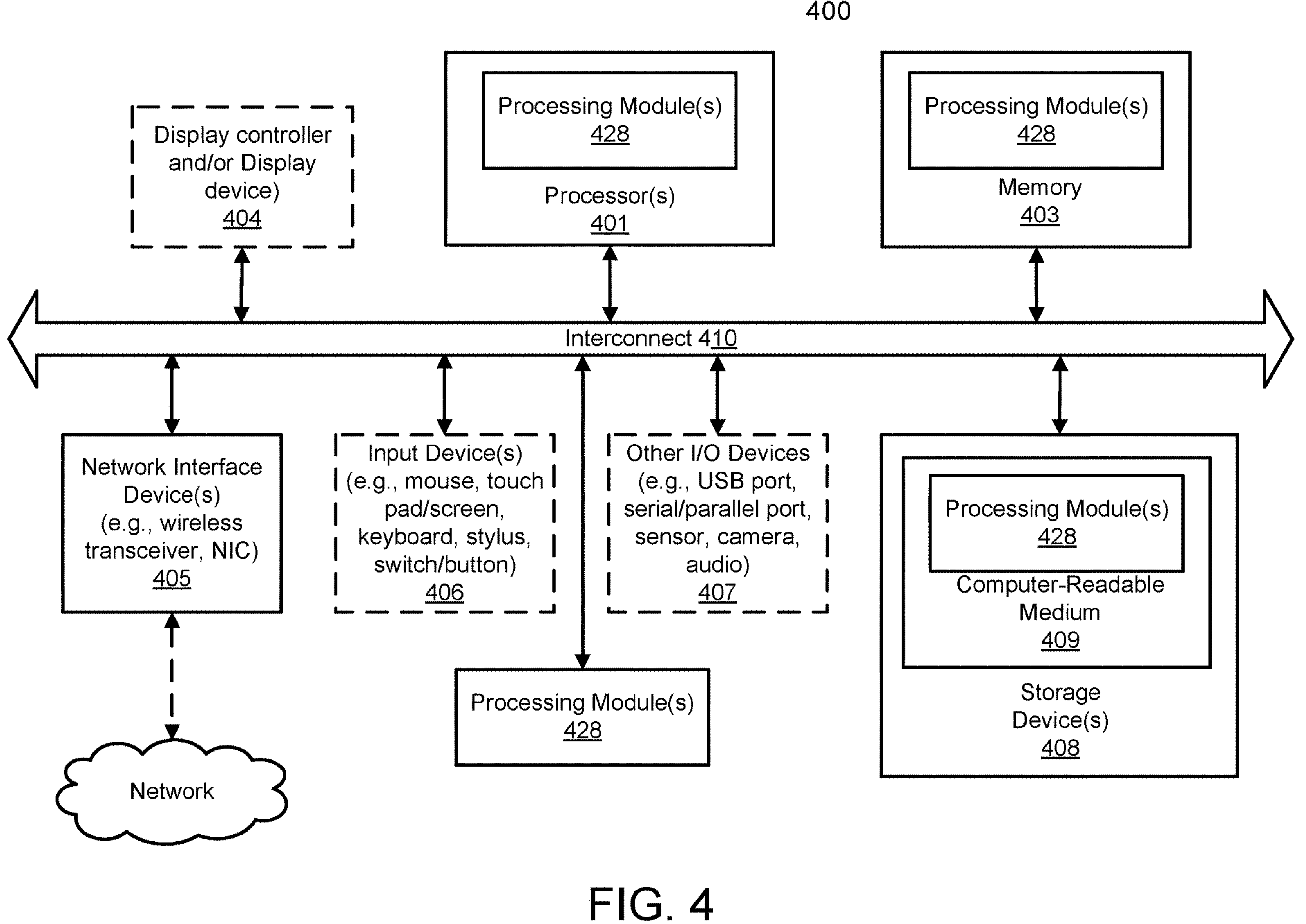
FIG. 4 shows a block diagram illustrating a data processing system in accordance with an embodiment.

Any of the components illustrated and/or described with respect to FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such, details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for curating data by a data manager, comprising:

obtaining at least a portion of the data from a data source;

identifying curation targets of the data;

making a determination regarding whether sufficient data curation resources are available to perform a data curation process for the curation targets within a target period of time;

in an instance of the determination where there are insufficient data curation resources available:

identifying a data curation resource of the data curation resources that has available curation bandwidth;

obtaining, based on scoring criteria, impact scores for the curation targets, wherein each impact score of the impact scores is based on at least one of:

a frequency of use of a corresponding curation target by an inference model that ingests at least a second portion of the data to generate an inference;

a measure of relative contribution of the corresponding curation target to the inference;

a measure of confidence in the inference; and a measure of importance of the corresponding curation target or the inference to a downstream consumer;

obtaining a rank for at least one curation target based on the impact score, the rank being usable to order the at least one curation target;

selecting a curation target of the curation targets for the data curation resource based on a rank ordering of the curation targets, the rank ordering being based on the impact scores for the curation targets;

assigning the curation target to the data curation resource in order to complete the data curation process for a portion of the curation targets within the target period of time; and curating the curation target using the data curation resource to obtain at least partially curated data.

2. The method of claim 1, wherein each impact score is based, at least in part, on a number of occurrences of the curation target in downstream use of the data.

3. The method of claim 2, wherein each impact score is further based, at least in part, on an attribution score for the curation target, the attribution score indicating a relative level of contribution to a future outcome in which the curation target is usable in the downstream use of the data.

4. The method of claim 3, wherein each impact score is further based, at least in part, on a level of confidence in predicting the future outcome through the downstream use of the data.

5. The method of claim 4, wherein each impact score is further based, at least in part, on the measure of importance of the curation target to a downstream consumer.

6. The method of claim 5, wherein each impact score is further based, at least in part, on a measure of dependence that the downstream consumer has on the predicting of the future outcome.

7. The method of claim 6, wherein the portion of the curation targets excludes at least one of the curation targets.

8. The method of claim 1, wherein the at least partially curated data complying with a schema for downstream use of the curation target.

9. A non-transitory machine-readable medium having instructions stored therein, which when executed by a processor, cause the processor to perform operations for curating data by a data manager, the operations comprising:

obtaining at least a portion of the data from a data source;

identifying curation targets of the data;

making a determination regarding whether sufficient data curation resources are available to perform a data curation process for the curation targets within a target period of time;

in an instance of the determination where there are insufficient data curation resources available:

identifying a data curation resource of the data curation resources that has available curation bandwidth;

obtaining, based on scoring criteria, impact scores for the curation targets, wherein each impact score of the impact scores is based on at least one of:

a frequency of use of a corresponding curation target by an inference model that ingests at least a second portion of the data to generate an inference;

a measure of relative contribution of the corresponding curation target to the inference;

a measure of confidence in the inference; and a measure of importance of the corresponding curation target or the inference to a downstream consumer;

obtaining a rank for at least one curation target based on the impact score, the rank being usable to order the at least one curation target;

selecting a curation target of the curation targets for the data curation resource based on a rank ordering of the curation targets, the rank ordering being based on the impact scores for the curation targets;

assigning the curation target to the data curation resource in order to complete the data curation process for a portion of the curation targets within the target period of time; and curating the curation target using the data curation resource to obtain at least partially curated data.

10. The non-transitory machine-readable medium of claim 9, wherein each impact score is based at least in part, on a number of occurrences of the curation target in downstream use of the data.

11. The non-transitory machine-readable medium of claim 10, wherein each impact score is further based, at least in part, on an attribution score for the curation target, the attribution score indicating a relative level of contribution to a future outcome in which the curation target is usable in the downstream use of the data.

12. The non-transitory machine-readable medium of claim 9, wherein the at least partially curated data complying with a schema for downstream use of the curation target.

13. A data processing system, comprising:

a processor; and a memory coupled to the processor to store instructions, which when executed by the processor, cause the processor to perform operations for curating data by a data manager, the operations comprising:

obtaining at least a portion of the data from a data source;

identifying curation targets of the data;

making a determination regarding whether sufficient data curation resources are available to perform a data curation process for the curation targets within a target period of time;

in an instance of the determination where there are insufficient data curation resources available:

identifying a data curation resource of the data curation resources that has available curation bandwidth;

obtaining, based on scoring criteria, impact scores for the curation targets, wherein each impact score of the impact scores is based on at least one of:

a frequency of use of a corresponding curation target by an inference model that ingests at least a second portion of the data to generate an inference;

a measure of relative contribution of the corresponding curation target to the inference;

a measure of confidence in the inference; and a measure of importance of the corresponding curation target or the inference to a downstream consumer;

obtaining a rank for at least one curation target based on the impact score, the rank being usable to order the at least one curation target;

selecting a curation target of the curation targets for the data curation resource based on a rank ordering of the curation targets, the rank ordering being based on the impact scores for the curation targets;

assigning the curation target to the data curation resource in order to complete the data curation process for a portion of the curation targets within the target period of time; and curating the curation target using the data curation resource to obtain at least partially curated data.

14. The data processing system of claim 13, wherein each impact score is based at least in part, on a number of occurrences of the curation target in downstream use of the data.

15. The data processing system of claim 14, wherein each impact score is further based, at least in part, on an attribution score for the curation target, the attribution score indicating a relative level of contribution to a future outcome in which the curation target is usable in the downstream use of the data.

16. The data processing system of claim 15, wherein each impact score is further based, at least in part, on a level of confidence in predicting the future outcome through the downstream use of the data.

17. The data processing system of claim 16, wherein each impact score is further based, at least in part, on the measure of importance of the curation target to a downstream consumer.

18. The data processing system of claim 17, wherein each impact score is further based, at least in part, on a measure of dependence that the downstream consumer has on the predicting of the future outcome.

19. The data processing system of claim 18, wherein the portion of the curation targets excludes at least one of the curation targets.

20. The data processing system of claim 13, wherein the at least partially curated data complying with a schema for downstream use of the curation target.

* * * * *